Sept. 10, 1946.  A. P. BALL  2,407,216
WATERING DEVICE FOR FOWLS
Filed June 5, 1942  2 Sheets-Sheet 2
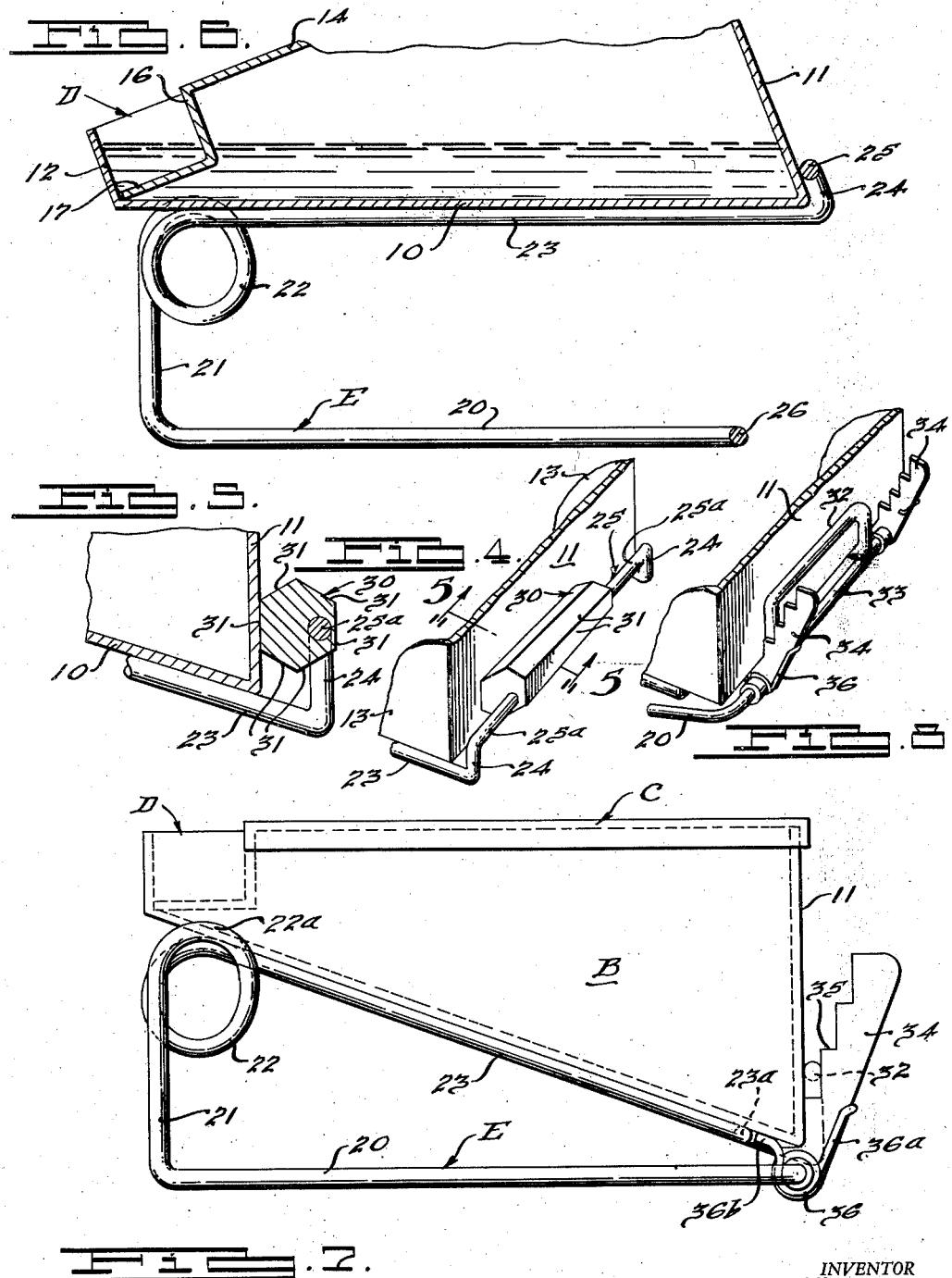
INVENTOR
Albert P. Ball.
BY
George & Smith
ATTORNEYS.

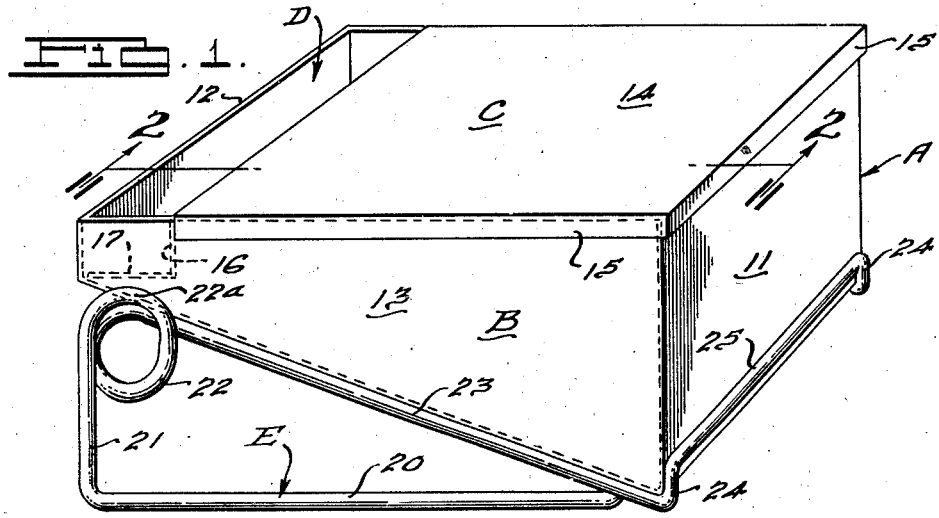
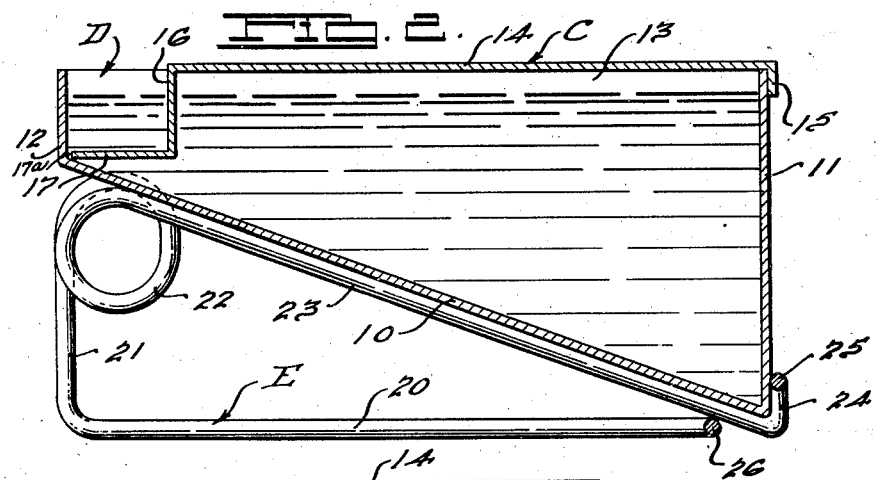
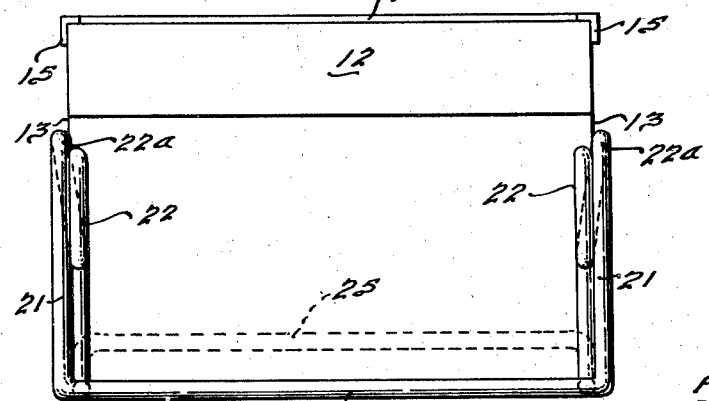

Patented Sept. 10, 1946

2,407,216

UNITED STATES PATENT OFFICE 2,407,216

WATERING DEVICE FOR FOWL

Albert P. Ball, Detroit, Mich.

Application June 5, 1942, Serial No. 445,896

17 Claims. (Cl. 119—74)

This invention relates to watering devices or water supply troughs for poultry fowl or stock.

It is a well known fact in the raising and maintaining of fowl, especially large flocks of fowl, such as chickens, ducks and turkeys, it is important that an adequate and constant supply of fresh and clean drinking water be available to them at all times. Because of the great activity of fowl and their relatively nervous habits, it is practically impossible to maintain clean and fresh water in open-top watering pans or troughs placed in the yards, pens, houses or coops where they are kept due to the fact that the fowl will get into or perch upon the watering devices and soil and pollute the water therein. This obviously creates an unsanitary and unhealthful condition which is often reflected in the condition of the fowl and also in the taste or flavor of the eggs produced by such fowl, particularly in the case of flocks of chickens.

Various kinds and types of watering devices have previously been made and used but such of these devices which at least partially prevented the soiling and pollution of the drinking water have been of complicated construction and, consequently, were relatively costly and, therefore, their sale and use have been restricted largely to the wealthier raisers of poultry. This restriction, due to the rather prohibitive cost of the more sanitary types of watering devices, has to a large extent, necessitated the continuation of the use by a large majority of poultry raisers of the less expensive but unsanitary pans, troughs and other open-top types of watering devices.

One of the objects of the present invention is to provide an improved sanitary watering device which is of relatively simple construction, inexpensive to manufacture, one which provides an ample and constant supply of clean and fresh water which is easily accessible to the fowl, and one in which it is difficult to foul or contaminate the water supply.

A further object of the invention is to provide a watering device of the foregoing character in which only a small portion of the entire body of water in the device is exposed or uncovered and in which the quantity and thus the level of the exposed portion of the water is maintained constant at all times.

Another object of the invention is to provide a watering device of the foregoing character having an exposed or uncovered trough-like portion in constant communication with the whole body of water in the device, and one in which means is provided for automatically replenishing the water in the trough-like portion as it is consumed to maintain the water level therein constant at all times.

A further object is to provide an improved watering device as aforesaid having an uncovered trough associated and in communication with the covered main body of the water supply in the device, and in which means is provided for elevating or tilting the device for replenishing the water as it is consumed from the trough and to thus maintain the water level therein constant.

Another object is to provide an improved device of the foregoing character having automatically operable supporting means for gradually elevating and tilting the device as the water is consumed to maintain the accessible portion of the water at a constant level in the trough portion of the device.

A further object is to provide an improved watering device as aforesaid having a water-containing tank, an associated communicating open-top trough and a supporting base, in which the base functions to automatically raise and thus vary the position of the tank as the water supply therein becomes diminished.

Another object of the invention is to provide an improved watering device comprising a water-containing tank and trough unit having a base or support which automatically varies the vertical position of the tank and trough as the water is consumed, and one in which the tank and trough unit is adjustable longitudinally with relation to the base or support to change the center of gravity of said tank.

The foregoing and other objects and advantages of the present invention will appear from the following description and appended claims when considered in connection with the accompanying drawings forming a part of this specification, wherein like reference characters designate corresponding parts in the several views.

Fig. 1 is a perspective view of one embodiment of the present invention.

Fig. 2 is a longitudinal sectional view taken substantially along the line 2—2 of Fig. 1, looking in the direction of the arrows.

Fig. 3 is a front elevational view of the structure shown in Figs. 1 and 2.

Fig. 4 is a fragmentary detail view showing a modified form of the present invention.

Fig. 5 is an enlarged fragmentary sectional view taken substantially along the line 5—5 of Fig. 4, looking in the direction of the arrows.

Fig. 6 is a view similar to Fig. 2 but illustrating a tilted or raised position of the tank after consumption of water therein.

Fig. 7 is a side elevation illustrating a further embodiment.

Fig. 8 is a detail fragmentary perspective view of the rear end of the device of Fig. 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, and particularly to the embodiment illustrated in Figs. 1 to 3 inclusive, there is shown therein an improved watering device embodying the present invention. The watering device as a whole is indicated by the letter A, B representing the supply tank or reservoir as a whole, C the removable cover for the tank, D the trough portion of said tank at the forward end thereof, and E the resilient or self-elevating base or supporting frame for the tank.

As seen in Figs. 1 and 2, the tank B is relatively deeper at its rear end portion than at its front end portion, the tank being of gradually increasing depth from the front end to the rear end thereof. The tank is preferably formed from sheet metal and comprises an inclined bottom wall 10, a rear upright wall 11, a short front upright wall 12, and generally triangularly shaped upright side walls 13, 13.

The removable cover C is provided with a top portion 14 having a depending flange 15 around three sides thereof which telescopes over the rear wall 11 and the side walls 13. The front or forward end of the cover portion 14 is provided with a depending front partition or wall portion 16 of substantially the same depth vertically as the short front wall 12 of the container. The wall 16 is extended forwardly to provide an angularly disposed substantially horizontal bottom wall or trough base 17. As seen in Fig. 2, the walls 16 and 17 of the cover cooperate with the front upright wall 12 of the tank to provide at the forward end of said tank a transversely disposed trough portion which, as stated above, is shown as a whole at D. It is preferred that the side edges of the back wall 16 of the trough and of the bottom wall 17 thereof fit fairly close to the container walls 13, and also that the front edge of the base 17 terminate close to the wall 12. However, it will be readily seen that some slight gap or crack 17a will remain between each of these edges and the tank so as to permit water from the main portion of the tank to replenish the water in the trough. Hence, the water level in the tank is always the same as it is in the trough since the trough portion D of the tank is in communication at all times with the main portion of the tank which is enclosed by the cover 14.

The tank B is adapted to be supported upon the ground or floor surface by means of the self-elevating base or supporting frame shown as a whole at E. As shown, this frame is preferably formed from spring steel wire of selected gage adapted to support the tank and to be fully depressed under tension when the tank is full of water. The construction of the spring support is such that it will gradually elevate or tilt the tank B as the water is consumed therefrom, changing the position of the tank from that shown in Fig. 1 to that shown, for example, in Fig. 6. Thus, as water is taken from the trough the spring E will gradually elevate the rear end of the tank with relation to the trough D to allow the water in the main portion of the tank to flow into the trough and maintain a substantially constant water level in said trough at all times. Thus, as the weight of the tank by virtue of the consumption of the water therein is lessened or decreased, the effort exerted by the spring supporting base will elevate and tilt the tank forwardly. As the water continues to be consumed, the supporting base tilts the tank upwardly until the inclined bottom wall 10 of the tank is disposed in a substantially horizontal plane as shown in Fig. 6. Thus, most of the water in the tank will eventually enter the trough and be made available for consumption.

As shown, the self-elevating supporting frame which, as stated above, is preferably formed from steel wire, comprises two substantially identical portions located at opposite sides of the tank. Each of these portions comprises a longitudinally extending substantially horizontal length of wire 20 which at its forward end has an upright portion 21, the wire being coiled to provide the tension coil 22 at each side of the tank and being then extended rearwardly and downwardly at an incline at 23. At the rear lower end of one wire course 23, the wire is turned upwardly at 24 and then bent laterally in a substantially horizontal direction to extend across the back upright wall 11 of the tank, as shown at 25. The far end of the wire course 25 is turned downwardly at 24 and then extended forwardly at the opposite side wall 13 of the tank in an inclined direction to provide a second upwardly inclined course 23 which is coiled at 22, extended downwardly in a substantially vertical direction at 21 and then rearwardly in a substantially horizontal direction at 20. The wire supporting frame E is preferably formed from a single piece of wire which may have its ends welded together at any suitable point. It is to be noted that the base portions 20 of the wire frame at each side of the tank B are interconnected by a horizontal section or course of wire 26 which underlies the bottom inclined wall 10 of the tank. By particular reference to Figs. 1 and 2, it will be seen that the back portion 24, 25 of the wire frame engages the rear upright wall 11 of the tank and provides a stop for holding the tank in position on the inclined wires 23. The outer convolutions 22a of the coils 22 are preferably extended in height so as to overlap the side walls 13 and thus hold the tank against lateral displacement on the wire supporting frame E.

From the foregoing it will be understood that as the water in the trough is consumed by the fowl the weight of the tank will be gradually diminished permitting the springs to gradually raise and tilt the tank whereby a constant supply of water will be maintained in the trough portion D at all times until the tank is empty.

It may prove desirable to shift or change the center of gravity of the tank B by adjusting the tank longitudinally with relation to its supporting frame structure or base. In this connection reference should be had to Figs. 4 and 5 of the drawings wherein there is shown one form of adjustment device suitable for this purpose. In this embodiment the transverse horizontal bridge portion 25 is split at the approximate center thereof to provide two sections 25a. An adjustment block 30, which may be hexagonal in cross section, is provided with a longitudinal bore or hole located eccentrically with relation to the longitudinal center of the block. The portions 25a of the bridge piece 25 are inserted in the bore and support the block in position so that one of its flat longitudinal faces 31 thereof will engage the outer face of the rear upright wall 11 of the tank. When it is desired to adjust the position of the tank B longitudinally with relation to its supporting base E, it is merely necessary to rotate the block 30 to bring any one of its flat faces 31 into engagement with the rear wall 11 of the tank. Thus, a relatively wide range of adjustment of the tank with relation to its supporting frame can be effected. The range of adjustment can be further increased by the substitution of a block of greater diameter than that shown. It is to be understood that the adjustment block 30 is shown merely by way of illustration as one means for effecting the longitudinal adjustment of the tank. Other suitable means may be provided for this purpose.

In some instances it may be found desirable, especially in connection with smaller size tanks, to prevent the partially empty tank from being depressed suddenly, such as when a chicken or fowl hops on the back end of the tank. This may be accomplished, for example, in the manner illustrated in Figs. 7 and 8. The rear ends of the wire portions 23 are bent inwardly at 23a short of the rear edge of the tank and thence are bent to form a rear abutment 32 for the tank somewhat narrower than the wall 11. The wire portions 20 are extended rearwardly to the back wall of the tank and are joined by a transverse course 33 running along and beneath the rear edge of the tank. Pivotally mounted on the wire portion 33 at opposite sides of the abutment 32 are a pair of dogs 34 having teeth 35. The dogs are constantly urged toward the tank by springs 36 coiled around the wire 33. The end 36a of each spring engages the rear edge of a dog and the opposite end 36b engages beneath the pan or tank. As the tank is elevated the teeth or steps 35 will successively move into positions beneath the bottom of the tank and thus hold the tank against displacement downwardly.

From the foregoing it will be seen that I have provided a sanitary watering device for fowl in which the major portion of the water supply is protected from soiling and contamination and in which the supply which is available to the fowl is maintained relatively constant at all times. Moreover, I have provided an automatic watering device for fowl in which the tank portion or unit thereof is gradually and progressively elevated as the water in the trough is used, thereby replenishing and maintaining a supply of water in the trough portion of the tank at all times.

I claim:

1. In a drinking device for poultry or stock, a tank adapted to contain a supply of water, a relatively narrow trough at one side of the tank separated from said tank but in communication therewith whereby the level of water in the tank and trough is maintained uniform, and spring means beneath the tank supporting the same and operative for automatically elevating only the side of said tank opposite to said trough as the water in the trough is consumed.

2. In a drinking fountain for poultry or stock, the combination of a tank containing a water supply, said tank having a removable cover provided with a portion at one end thereof extending into said tank and providing with the tank a water-receiving trough located at one end thereof and in communication with the tank, and a supporting base for said tank including spring means for tilting the tank and elevating the end thereof opposite to the trough as the quantity of water therein is reduced whereby to maintain a substantially constant water level in said trough.

3. In a watering device for fowl or stock, the combination of a water reservoir having an open top trough at one end thereof and in communication therewith, a removable cover for said reservoir, and supporting means for the reservoir located therebeneath and including resilient means to automatically elevate and tilt the same in the direction of said trough as the water supply is diminished whereby to maintain a substantially constant level of water in the trough.

4. In a drinking fountain for poultry or stock, the combination of a water-containing tank having an uncovered portion at one end thereof, said tank being progressively deeper toward its opposite end, and a base for said tank including resilient means adapted to gradually elevate the deeper end of said tank as the water is consumed from the tank to maintain a substantially constant water level in the uncovered end portion of said tank.

5. In a poultry or stock drinking fountain, the combination of a water-containing tank having an uncovered portion at one end thereof, said tank being progressively deeper toward its opposite end, a supporting base for said tank including resilient means adapted to gradually elevate the deeper end of said tank as the water is consumed from the tank to maintain a substantially constant water level in the uncovered end portion of said tank, and means for adjusting the tank longitudinally with relation to the supporting base.

6. In a poultry or stock drinking fountain, the combination of a tank for containing a water supply, said tank having a sloping bottom wall and providing a relatively deep portion at one end of the tank and a relatively shallower uncovered portion at the opposite end of the tank, and a wire-formed spring-tensioned frame for supporting said tank, said frame tending to elevate the tank as the quantity of water therein is reduced to gradually move the inclined bottom wall of the tank toward a substantially horizontal plane whereby to maintain the water level relatively constant in the uncovered portion of said tank.

7. In a poultry or stock drinking fountain, the combination of a tank containing a water supply, said tank having a sloping bottom wall and being relatively deeper at its inner end than at its outer uncovered end, a removable cover for said tank providing a trough-like portion at the outer end of the tank in communication with the remainder of said tank, and a spring-tensioned supporting base frame for the tank for elevating the deeper end of said tank as the supply of water therein is consumed to maintain a substantially constant water level in the trough-like portion of said tank.

8. In a poultry or stock drinking fountain, the combination of a tank containing a water supply, said tank having a sloping bottom wall and being relatively deeper at its inner end than at its outer uncovered end, a removable cover for said tank providing a trough-like portion at the outer shallower end of the tank in communication with the remainder of said tank, spring means for elevating the deeper end of said tank as the supply of water therein is consumed to maintain a substantially constant water level in the trough-like portion of said tank, and means for adjusting said tank longitudinally of the base frame whereby to vary the location of the center of gravity of said tank.

9. In a poultry or stock drinking fountain, the combination of a tank containing a water supply, said tank having a sloping bottom wall and being relatively deeper at its inner end than at its outer uncovered end, a removable cover for said tank having a portion providing an open top trough at the shallower end of the tank in communication with the remainder of said tank, and a spring-tensioned supporting base frame for the tank for progressively elevating the deeper end of said tank as the supply of water therein is consumed to maintain a substantially constant water level in said trough, said base frame comprising a ground-engaging portion and a relatively movable integral tank-engaging portion.

10. In a poultry drinking fountain, the combination of a tank containing a water supply, said tank having a sloping bottom wall and being relatively deeper at its inner end than at its outer uncovered end, a removable cover for said tank providing with said tank an open top trough-like portion at the shallower end of the tank, and a spring supporting base frame for progressively tilting the tank to elevate the deeper end thereof as the supply of water therein is diminished to maintain a substantially constant water level in the trough-like portion of said tank, said base frame being formed at least in part from wire and comprising a ground-engaging portion and a tank-engaging portion connected together by coiled spring portions providing tensioning means for moving the tank-engaging portion upward relative to said ground-engaging portion.

11. In a poultry or stock watering device, the combination of a water receptacle having a relatively long and narrow uncovered trough at one end thereof, said receptacle being of gradually increasing depth from the trough to the opposite end thereof, a removable cover for the receptacle having means at one end thereof forming at least a portion of said trough, and a support for the receptacle including spring means for progressively elevating and tilting the same in the direction of the trough as the supply of water in said receptacle is diminished.

12. In a poultry or stock watering device, the combination of a water receptacle having a relatively long and narrow uncovered trough at one end thereof, said receptacle being of gradually increasing depth from the trough to the opposite end thereof, a removable cover for the receptacle having means at one end thereof forming at least a portion of said trough, a support for the receptacle including spring means for progressively elevating and tilting the same in the direction of the trough as the supply of water in said receptacle is diminished, and means for automatically holding said receptacle in various tilted positions against any substantial downward movement.

13. In a drinking device for poultry or stock, a tank adapted to contain a supply of water, a relatively narrow trough at one side of the tank separated from said tank but in communication therewith whereby the level of water in the tank and trough is maintained uniform, means for automatically elevating said tank as the water in the trough is consumed, and means for automatically holding said receptacle in various tilted positions against any substantial downward movement.

14. In a watering device of the class described a reservoir having a closed top, an open top trough at one side of the reservoir and communicating therewith whereby water will flow from the reservoir into the trough to replenish the supply therein as it is consumed in the trough, said reservoir being progressively deeper from the trough toward the opposite side of the reservoir, and spring means for automatically elevating the reservoir as the water therein passes from the reservoir to the trough.

15. In a watering device, a reservoir to contain water, a trough at one side of the reservoir having communication with the reservoir, the bottom of the reservoir when filled with water or substantially so being below the bottom of the trough, and spring means beneath the tank supporting the same and operative for automatically elevating the reservoir to replenish the supply in the trough as the water is consumed in the trough.

16. In a watering device, a reservoir, a trough at one side of the reservoir communicating therewith and having its bottom above the bottom of the reservoir, said reservoir being progressively deeper from the trough toward the opposite side of the reservoir, and spring means for elevating the reservoir relatively to the trough to cause the water therein to flow into the trough as the water in the latter is consumed.

17. In a watering device, a closed top reservoir, an open top trough at one side of the reservoir communicating therewith and having its bottom above the bottom of the reservoir, and spring means arranged beneath and in supporting relation to the reservoir for elevating the reservoir relatively to the trough to cause the water therein to flow into the trough as the water in the latter is consumed.

ALBERT P. BALL.